UNITED STATES PATENT OFFICE 2,451,085

INSECTICIDAL HALOIDO-ALKYLENE ESTERS OF CAPRYLPHENOXYACETIC ACID

William F. Hester, Drexel Hill, and W E Craig, Philadelphia, Pa., assignors to Rohm & Haas Company, Philadelphia, Pa., a corporation of Delaware No Drawing. Application June 14, 1945, Serial No. 599,508

18 Claims. (Cl. 167—30)

This invention relates to new compounds and to insecticidal compositions comprising as an active agent one of said compounds, esters of caprylphenoxyacetic acid, in which the alcohol portion contains an alkylene chain, which may be interrupted by oxygen and which carries a haloid, and a carrier therefor. These toxic agents are of the formula

wherein Ph is a phenyl nucleus, $m$ is a number from zero to two, inclusive, X is a haloid, and $C_nH_{2n}$ is a hydrocarbon chain of at least two carbon atoms in which $n$ has a value of two to three, inclusive.

As is shown in this application and in our closely related patent applications Serial Nos. 599,509, (now Patent No. 2,437,427, dated Mar. 9, 1948) and 599,510 (now Patent No. 2,437,527 dated Mar. 9, 1948), filed on even date, the caprylphenoxyaceto-nucleus is a peculiarly effective one insecticidally when carrying certain substituent groups. One of the most effective types of such groups is shown in the present application to be a haloido-alkylene group or a haloido-alkylene group the hydrocarbon chain of which is interrupted by oxygen, in which groups the alkylene chains have two or three carbon atoms, being in particular ethylene or propylene groups. The caprylphenyl nucleus may contain such substituents as chlorine, bromide, nitro, amino, or alkyl (in addition to the capryl group), etc. Insecticidal compositions based upon the esters of the composition

may be safely and effectively applied to living plants for the control of insects thereon, particularly soft-bodied insects, with considerable advantage.

The esters of this invention may be prepared from substituted or unsubstituted caprylphenoxyacetic acids by esterifying reactions with halohydrins, reactions with haloethyl ethers, or reactions with cyanohydrins. The usual chlorine or bromine of such groups may readily be replaced with iodine or with such halogenoids as the thiocyano- or cyano-groups, which are classed as haloids or halogenoids and, in this particular type of compound, appear generally equivalent to the halogens proper. Procedures for varying the substituents will be obvious to those skilled in the art.

Esters of the above type are mixed with a carrier to form the insecticidal compositions of this invention. The carrier may be an innocuous solvent therefor or a finely divided solid. Such compositions may also contain dispersing, spreading, and/or sticking agents. The compositions may be applied in aqueous sprays or dust to living plants infested with insects.

Further details are given in the following illustrative examples.

Example 1

*Preparation of β-chloroethyl caprylphenoxyacetate.*—A mixture of 529 grams of caprylphenoxyacetic acid and 101 grams of phosphorus trichloride was stirred for two hours at 70° to 75° C. The phosphorus acid which resulted in the reaction separated as a viscous lower layer, from which the upper layer of caprylphenoxyacetyl chloride was decanted. To 544 grams of the acid chloride there was slowly added 200 grams of commercial ethylene chlorohydrin, with stirring. As reaction occurred, the temperature of the resulting mixture rose to 51° C. and hydrogen chloride was evolved. The reaction mixture was then stirred for two hours, while it was maintained at 70°–75° C. It was then cooled and washed, first with water, then with a 2% sodium sulfate solution, and then three times with a 2% calcium chloride solution. It was then concentrated on a water bath under reduced pressure. A clear brown oil was obtained which, by analysis, was found to contain 91.5% of β-chloroethyl caprylphenoxyacetate and 8.4% of caprylphenoxyacetic acid. While this oil can be further purified by removal of the acid, charcoaling, extraction, and similar methods, it was not found necessary to do so, since the crude product as first obtained proved to be a potent toxic agent for insects.

Instead of the caprylphenoxyacetic acid used above, there may be similarly employed equivalent weights of substituted caprylphenoxyacetic acid, such as bromo- or chloro-caprylphenoxyacetic acid or methylcaprylphenoxyacetic acid. The esters obtained are all effective toxic agents in insecticidal compositions.

Instead of the ethylene chlorohydrin used above, there may be used ethylene bromohydrin or propylene chloro- or bromohydrins.

Example 2

*Preparation of β-(β'-chloroethoxy)-ethyl caprylphenoxyacetate.*—A mixture of 119 grams of caprylphenoxyacetic acid, 258 grams of β,β'-dichlorodiethyl ether, 10 grams of 35% aqueous dimethylamine, and 43.5 grams of a 50% aqueous sodium hydroxide solution was stirred and heated under reflux conditions with a trap in the return line for condensate to remove water. The temperature was carried to 180° C. over the course of an hour and a half. The reaction mixture was then cooled, washed with water, washed with dilute alkali, and finally washed with slightly acidulated water. The oil layer was separated and heated on an oil bath up to 250° C. at 30 mm. This removed excess dichloroethyl ether and left 155 grams of an oily residue which contained, by analysis, 86% of $\beta$-($\beta'$-chloroethoxy)-ethyl caprylphenoxyacetate.

Instead of the dichloroethyl ether used above, there may be used $\beta,\beta'$-dibromoethyl ether or the analogous dichlorotriglycol or dibromotriglycol to form chloro- or bromo-ethoxyethyl caprylphenoxyacetates. Instead of caprylphenoxyacetic acid used above, there may be used a substituted caprylphenoxyacetic acid.

The chloro- or bromo-ethyl groups in the above compounds may be converted to cyano- or thiocyano-groups by reaction with metal cyanides and metal thiocyanates, respectively, or to the iodo compounds by reaction with an iodide, such as sodium or potassium iodide, as illustrated by the following examples.

Example 3

A reaction mixture consisting of 408.5 grams (1.25 mols) of $\beta$-chloroethyl caprylphenoxyacetate, 145 grams (1.75 mols) of 98% sodium thiocyanate, 204 grams of methyl isobutyl ketone, and traces of copper powder and sodium iodide was stirred for twenty-eight hours at a reaction temperature of 129°–139° C. After being cooled, the inorganic salts were filtered off and washed with petroleum ether; and the combined filtrates were washed three times with water, dried over calcium chloride, and concentrated in a boiling water bath at reduced pressure to give 411 grams of viscous brown oil which contained, by analysis, 2.74% of nitrogen. The calculated nitrogen value for $\beta$-thiocyanoethyl caprylphenoxyacetate is 4.00%.

Example 4

A reaction mixture consisting of 93 grams of $\beta$-($\beta'$-chloroethoxy)-ethyl caprylphenoxyacetate of 85% purity by chlorine analysis, 29 grams of 98% sodium thiocyanate, 50 grams of methyl isobutyl ketone, and a trace of copper powder was stirred at reflux temperature (130° C.) for twenty-three hours. The mixture was cooled, benzene was added, the inorganic residue was filtered off, and the filtrate was washed four times with water. It was then concentrated to give 106 grams of brown oil which contained 2.43% of nitrogen by analysis. The calculated nitrogen value for $\beta$-($\beta'$-thiocyanoethoxy)-ethyl caprylphenoxyacetate is 3.55%.

Another method of preparing such compounds is illustrated in the next example.

Example 5

To 70 grams (0.2 mol) of capryldichlorophenoxyacetyl chloride there was added at 26°–36° C. over a twenty-minute period 29.4 grams (0.2 mol) of $\beta$-thiocyano-$\beta'$-hydroxyethyl ether. The resulting solution was stirred for two hours in a boiling water bath. Since no appreciable hydrogen chloride was evolved, the solution was cooled and 16 grams (0.2 mol) of pyridine was added at 19°–34° C. After the mixture was stirred for four hours at room temperature, ethylene dichloride was added. The resulting mixture was washed with water three times, dried over calcium chloride, and concentrated at 100° C. and 25 mm. pressure. The yield was 87 grams of dark brown oil. This contained, by analysis, 2.87% of nitrogen and 15.17% of chlorine, which are 95% and 99% of the nitrogen and chlorine values calculated for $\beta$-($\beta'$-thiocyanoethoxy)-ethyl capryldichlorophenoxyacetate.

Esters of the type described above are effective toxic agents in insecticidal compositions, as has been indicated. They may be used as the sole toxicant in a given composition or they may be used in conjunction with other toxic agents, such as naturally occurring agents, including pyrethrins, rotenone, and nicotine, or other organic thiocyanates than the thiocyano-alkylene or thiocyano-alkoxyalkylene esters of this invention, and other synthetic or natural agent. Furthermore, they may be used in conjunction with fungicidal agents.

In the preparation of an insecticidal composition of the solid type, the esters may be mixed directly with a finely divided solid carrier. Alternatively, a solution of such ester may be made in a volatilizable solvent and the solution applied to such solid with subsequent removal of the solvent.

As a solid carrier, there may be used one or more of such materials as clay, talc, pyrophyllite, asbestine, magnesium carbonate, chalk, diatomaceous earth, alum sludge, lime, and the like. There may be incorporated with such solids spreaders or stickers.

Concentrations of the toxicants may advisedly be varied from one half to ten per cent in such compositions. These may be applied as dusts, or they may be taken up in water and applied in the forms of sprays.

Typical formulations involving solid compositions follow:

A

| | Parts |
|---|---|
| Toxicant | 1 |
| Talc | 98 |
| Spreader or sticker | 1 |

B

| | Parts |
|---|---|
| Toxicant | 2 |
| Alum sludge | 48 |
| Lime | 48 |
| Soya bean oil | 2 |

On the other hand, the esters described above may be taken up with a liquid carrier. Innocuous organic solvents are generally suitable for this purpose. Typical of these are pine oils, higher liquid alcohols such as octyl alcohol or cyclohexanol, ketones such as hexyl methyl ketone, or various vegetable or mineral oils, or mixtures of such solvents.

Advantageously, such solvent compositions may be made with a solvent-soluble emulsifier or a dispersing agent which renders the composition self-dispersing in water. There may otherwise be used an emulsifying agent at the time of preparation of a spray from the liquid composition.

Typical liquid compositions may be made from one part of the esters of the above type, one to ten parts of an organic solvent, and one tenth to one part of an organic solvent-soluble dispersing agent, such as a polyalkoxyether alcohol prepared from a long-chained alcohol or phenol and an alkylene oxide, for example, diisobutylpolyethoxy ethanol, or a condensate of polyglycerol and a higher fatty acid with maleic acid, or a petroleum sulfonate. These compositions are self-dispersing when added to water.

Tests against various insects are reported below.

Example 6

(a) β-chloroethyl caprylphenoxyacetate was taken up in clay and this mixture diluted with talc to give a dust containing 2% of the active agent. This dust was applied to bean plants infested with leafhopper nymphs. The kill obtained, 78%, may be compared with that of 32% resulting under the same conditions with a commercial rotenone dust.

(b) Another preparation of the above ester was dissolved in pine oil and petroleum sulfonate in a ratio of three to four to one for these three components. When this composition was diluted with water to give a dilution of one part of ester in 350 parts of water and sprayed on young cabbage plants infested with aphids, a kill of 79% was obtained. There was no foliage injury.

(c) When the above spray was applied to bean plants infested with red spiders at a dilution of 1 to 264, a 98% kill was obtained, again without any evidence of foliage injury.

(d) A 1% dust made with magnesium carbonate, when applied to bean plants infested with Mexican bean beetle larvae, gave a control of 62%.

(e) A 1% solution of the above ester was made in volatile hydrocarbons and applied to woolen cloth, which was then dried and exposed to the atmosphere for two months. Samples of this cloth placed in a cage with clothes moths killed the moths.

Example 7

(a) A dust containing 2% β-thiocyanoethyl caprylphenoxyacetate was applied to nasturtiums infested with aphids. A kill of 79% was obtained. No foliage injury resulted.

(b) A solution was made of one part of β-thiocyanoethyl caprylphenoxyacetate in two parts of pine oil and one part of petroleum sulfonate added. This composition was stirred into water at the proportion of one part to about two hundred parts and the resulting emulsion sprayed onto young cabbage plants infested with aphids. A kill of 75% was obtained without foliage injury.

(c) When the above spray was applied to bean plants infested with red spiders at a dilution of 1 to 220, a 79% kill was obtained.

Example 8

(a) A mixture of capryl-

$C_6H_4$—$OCH_2COOC_2H_4OC_2H_4Cl$ was made with the condensate of polyglycerol, coconut fatty acids, and maleic acid in the ratio of five parts to four parts and eleven parts of pine oil added. This composition was stirred into water and applied in the form of a spray at a concentration of one part of the ester to 1600 parts of water to nasturtium plants infested with aphids. A kill of 75% was obtained. There was no foliage injury.

(b) A similar composition applied to bean plants infested with red spiders, but diluted to give an aqueous spray containing one part of the ester in 1200 parts of water, gave a kill of 97%.

(c) A solution of 1% of the above ester in volatile hydrocarbons was applied to woolen cloth, which was dried and exposed for several months before being tested. This treated cloth, when exposed to carpet beetles, permitted little feeding thereon and killed all of the carpet beetles.

(d) Another sample of the above ester was mixed with magnesium carbonate and the resulting composition taken up in water at the proportion of one pound of ester per hundred gallons of water. When this dispersion was sprayed on bean plants infested with bean beetle larvae, a control of 76% was obtained.

Example 9

(a) A composition was prepared from five parts of capryl-$C_6H_4OCH_2COOC_2H_4OC_2H_4SCN$, four parts of the condensate of polyglycerol, coconut acid, and maleic acid, and eleven parts of cottonseed oil and pine oil mixture. When this composition was dispersed in water and applied to nasturtium plants infested with aphids, a kill of 92% was obtained.

(b) Another sample of the above ester mixed with magnesium carbonate and dispersed in water at one pound of ester per one hundred gallons of water was applied as a spray to bean plants infested with bean beetle larvae. A control of 86% was obtained.

(c) A standard Peet-Grady fly test of a 2% solution of the above ester in kerosene gave a knockdown of 89% and a kill of —8 vs. O. T. I. The spray gave no irritation.

We claim:

1. Compounds of the formula

Capryl-Ph-$OCH_2COOC_nH_{2n}(OC_nH_{2n})_mX$ wherein Ph is a phenyl nucleus, X is a haloid from the group consisting of chlorine, bromine, iodine, thiocyano- and cyano-groups, m is a number from zero to two, inclusive, and $C_nH_{2n}$ is an alkylene chain of at least two carbon atoms in which n has a value of two to three, inclusive.

2. Compounds of the formula

Capryl-Ph-$OCH_2COOC_nH_{2n}(OC_nH_{2n})_mCl$ wherein Ph is a phenyl nucleus, m is a number from zero to two, inclusive, and $C_nH_{2n}$ is an alkylene chain of at least two carbon atoms in which n has a value of two to three, inclusive.

3. Compounds of the formula

Capryl-Ph-$OCH_2COOC_nH_{2n}(OC_nH_{2n})_mSCN$ wherein Ph is a phenyl nucleus, m is a number from zero to two, inclusive, and $C_nH_{2n}$ is an alkylene chain of at least two carbon atoms in which n has a value of two to three, inclusive.

4. Compounds of the formula

Capryl-Ph-$OCH_2COOCH_2CH_2(OCH_2CH_2)_mX$ wherein Ph is a phenyl nucleus, m is a number from zero to two, inclusive, and X is a haloid from the group consisting of chlorine, bromine, iodine, thiocyano- and cyano-groups.

5. Compounds of the formula

Capryl-Ph-$OCH_2COOCH_2CH_2(OCH_2CH_{2m}Cl$ wherein Ph is a phenyl nucleus and m is a number from zero to two, inclusive.

6. Compounds of the formula

Capryl-Ph-$OCH_2COOCH_2CH_2(OCH_2CH_2)_mSCN$ wherein Ph is a phenyl nucleus and m is a number from zero to two, inclusive.

7. A compound of the formula

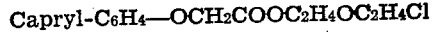
Capryl-$C_6H_4$—$OCH_2COOC_2H_4OC_2H_4Cl$

8. A compound of the formula

Capryl-$C_6H_4$—$OCH_2COOC_2H_4OC_2H_4SCN$

9. A compound of the formula

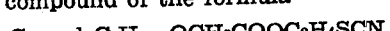
Capryl-$C_6H_4$—$OCH_2COOC_2H_4SCN$

10. An insecticidal composition particularly suitable for use on plants which comprises a carrier and a compound of the formula $$\text{Capryl-Ph-OCH}_2\text{COOC}_n\text{H}_{2n}(\text{OC}_n\text{H}_{2n})_m\text{X}$$

wherein Ph is a phenyl nucleus, X is a haloid from the group consisting of chlorine, bromine, iodine, thiocyano- and cyano-groups, $m$ is a number from zero to two, inclusive, and $C_nH_{2n}$ is an alkylene chain of at least two carbon atoms in which $n$ has a value of two to three, inclusive.

11. An insecticidal composition particularly suitable for use on plants which comprises a carrier and a compound of the formula $$\text{Capryl-Ph-OCH}_2\text{COOC}_n\text{H}_{2n}(\text{OC}_n\text{H}_{2n})_m\text{Cl}$$

wherein Ph is a phenyl nucleus, $m$ is a number from zero to two, inclusive, and $C_nH_{2n}$ is an alkylene chain of at least two carbon atoms in which $n$ has a value of two to three, inclusive.

12. An insecticidal composition particularly suitable for use on plants which comprises a carrier and a compound of the formula $$\text{Capryl-Ph-OCH}_2\text{COOC}_n\text{H}_{2n}(\text{OC}_n\text{H}_{2n})_m\text{SCN}$$

wherein Ph is a phenyl nucleus, $m$ is a number from zero to two, inclusive, and $C_nH_{2n}$ is an alkylene chain of at least two carbon atoms in which $n$ has a value of two to three, inclusive.

13. An insecticidal composition particularly suitable for use on plants which comprises a carrier and a compound of the formula $$\text{Capryl-Ph-OCH}_2\text{COOCH}_2\text{CH}_2(\text{OCH}_2\text{CH}_2)_m\text{X}$$

wherein Ph is a phenyl nucleus, $m$ is a number from zero to two, inclusive, and X is a haloid from the group consisting of chlorine, bromine, iodine, thiocyano- and cyano-groups.

14. An insecticidal composition particularly suitable for use on plants which comprises a carrier and a compound of the formula $$\text{Capryl-Ph-OCH}_2\text{COOCH}_2\text{CH}_2(\text{OCH}_2\text{CH}_2)_m\text{Cl}$$

wherein Ph is a phenyl nucleus and $m$ is a number from zero to two, inclusive.

15. An insecticidal composition particularly suitable for use on plants which comprises a carrier and a compound of the formula $$\text{Capryl-Ph-OCH}_2\text{COOCH}_2\text{CH}_2(\text{OCH}_2\text{CH}_2)_m\text{SCN}$$

wherein Ph is a phenyl nucleus and $m$ is a number from zero to two, inclusive.

16. An insecticidal composition particularly suitable for use on plants which comprises a carrier and a compound of the formula $$\text{Capryl-C}_6\text{H}_4\text{—OCH}_2\text{COOC}_2\text{H}_4\text{OC}_2\text{H}_4\text{Cl}$$

17. An insecticidal composition particularly suitable for use on plants which comprises a carrier and a compound of the formula $$\text{Capryl-C}_6\text{H}_4\text{—OCH}_2\text{COOC}_2\text{H}_4\text{OC}_2\text{H}_4\text{SCN}$$

18. An insecticidal composition particularly suitable for use on plants which comprises a carrier and a compound of the formula $$\text{Capryl-C}_6\text{H}_4\text{—OCH}_2\text{COOC}_2\text{H}_4\text{SCN}$$

WILLIAM F. HESTER.
W E CRAIG.

REFERENCES CITED

The following references are of record in the file of this patent:

UNITED STATES PATENTS

| Number | Name | Date |
|---|---|---|
| 1,021,095 | Grether | Mar. 26, 1912 |
| 2,179,209 | Daimler et al. | Nov. 7, 1939 |
| 2,239,079 | Coleman et al. | Apr. 22, 1941 |
| 2,299,604 | Weirich | Oct. 20, 1942 |